United States Patent
Richardson

(10) Patent No.: US 11,123,662 B2
(45) Date of Patent: Sep. 21, 2021

(54) POROUS LAYERED FILM

(71) Applicant: Imagine TF, LLC, Campbell, CA (US)

(72) Inventor: Brian Edward Richardson, Los Gatos, CA (US)

(73) Assignee: Imagine TF, LLC, Los Gatos, CA (US)

(*) Notice: Subject to any disclaimer, the term of this patent is extended or adjusted under 35 U.S.C. 154(b) by 82 days.

(21) Appl. No.: 16/569,028

(22) Filed: Sep. 12, 2019

(65) Prior Publication Data

US 2020/0078710 A1  Mar. 12, 2020

Related U.S. Application Data

(60) Provisional application No. 62/765,758, filed on Sep. 12, 2018.

(51) Int. Cl.
  *B01D 29/03* (2006.01)
  *B01D 29/01* (2006.01)
  *B32B 27/08* (2006.01)
  *B32B 3/30* (2006.01)
  *B01D 39/16* (2006.01)

(52) U.S. Cl.
  CPC ........... *B01D 29/03* (2013.01); *B01D 29/012* (2013.01); *B32B 3/30* (2013.01); *B32B 27/08* (2013.01); *B01D 2029/033* (2013.01); *B01D 2239/1216* (2013.01)

(58) Field of Classification Search
  CPC ................. B01D 29/03; B01D 29/012; B01D 2029/033; B01D 2239/1216; B01D 2239/065; B01D 39/1692; B01D 67/0034; B01D 67/0062; B32B 27/08; B32B 3/30
  See application file for complete search history.

(56) References Cited

U.S. PATENT DOCUMENTS

| | | | | |
|---|---|---|---|---|
| 2,089,548 A | * | 8/1937 | Frantz | B01D 35/28 210/389 |
| 3,250,703 A | * | 5/1966 | Levendusky | B01D 25/26 210/660 |
| 5,476,588 A | * | 12/1995 | Nagaoka | B01D 29/012 210/499 |

* cited by examiner

*Primary Examiner* — Liam Royce
(74) *Attorney, Agent, or Firm* — Keith Kline; The Kline Law Firm PC

(57) ABSTRACT

A layered porous film with a fluidic path through orthogonally oriented ribbed layers of varying size and spacing for the filtering or separation of particles or compounds. Any number of additional layers and materials may be added to modify the flow characteristics through the film.

16 Claims, 18 Drawing Sheets

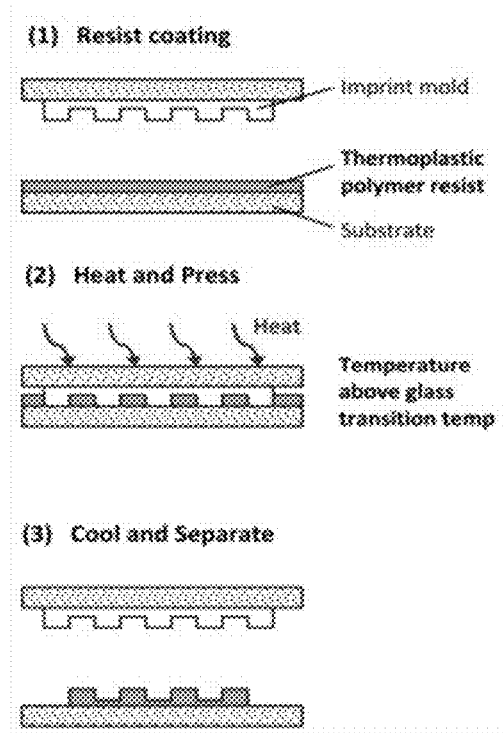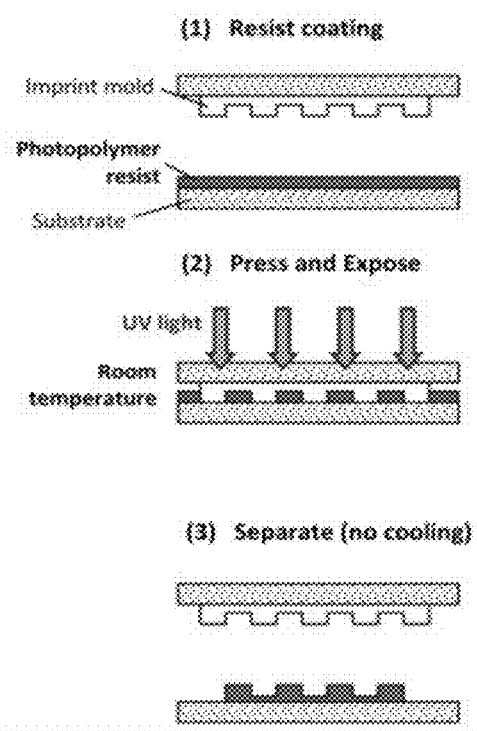
*Fig. 8a*  *Fig. 8b*

POROUS LAYERED FILM

CROSS REFERENCE TO RELATED APPLICATIONS

This application claims the priority benefit of U.S. provisional application No. 62/765,758, "Multi Layered Film with Nano Pores", filed Sep. 12, 2018, the disclosure of which is hereby incorporated by reference for all purposes in its entirety.

FIELD OF THE DISCLOSURE

The present disclosure is for a layered porous film, the film being used for separation and/or filtration of particles and compounds.

BACKGROUND

The architecture of the layered porous film allows for the use of conventional manufacturing equipment. The use of conventional equipment allows for high dimensional accuracy. The accuracy allows for filtration and separation of particles with a high degree of accuracy. This accuracy is desirable for a number of markets including but not limited to; biotech, water supply, deionization, chemical processing and waste water filtration.

SUMMARY

Various embodiments of the present invention include a layered porous film that is formed with a first layer with openings therein to allow fluid flow through the first layer. The film further includes a second layer connected to the first layer and having elongated members spaced apart to form slots between the elongated members, so that the slots form a path for fluid flow through the second layer. A third layer with elongated ribs positioned orthogonally to the slots in the second layer is connected to the second layer. The ribs are spaced apart to form throughways to allow fluid flow through the third layer. The sizes of the openings, slots, and throughways in the layered porous film are each selected by a user for a given application.

Embodiments of the invention may utilize sizes of the openings in the first layer, the slots in the second layer, and the throughways in the third layer that are progressively smaller from the first layer to the third layer.

Further embodiments may include at least a fourth layer of elongated ribs connected to the third layer. Typically, the openings between the ribs of the fourth layer are smaller than the throughways of the third layer.

In still further embodiments, the ribs of the fourth and succeeding layers may be oriented in more than one direction.

In further embodiments, material is deposited on the ribs of the third layer so as to reduce the effective size of the throughways therein.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

FIGS. 8a and 8b show process diagrams of exemplary methods that can be used to manufacture the porous film.

DETAILED DESCRIPTION

Figure 1:
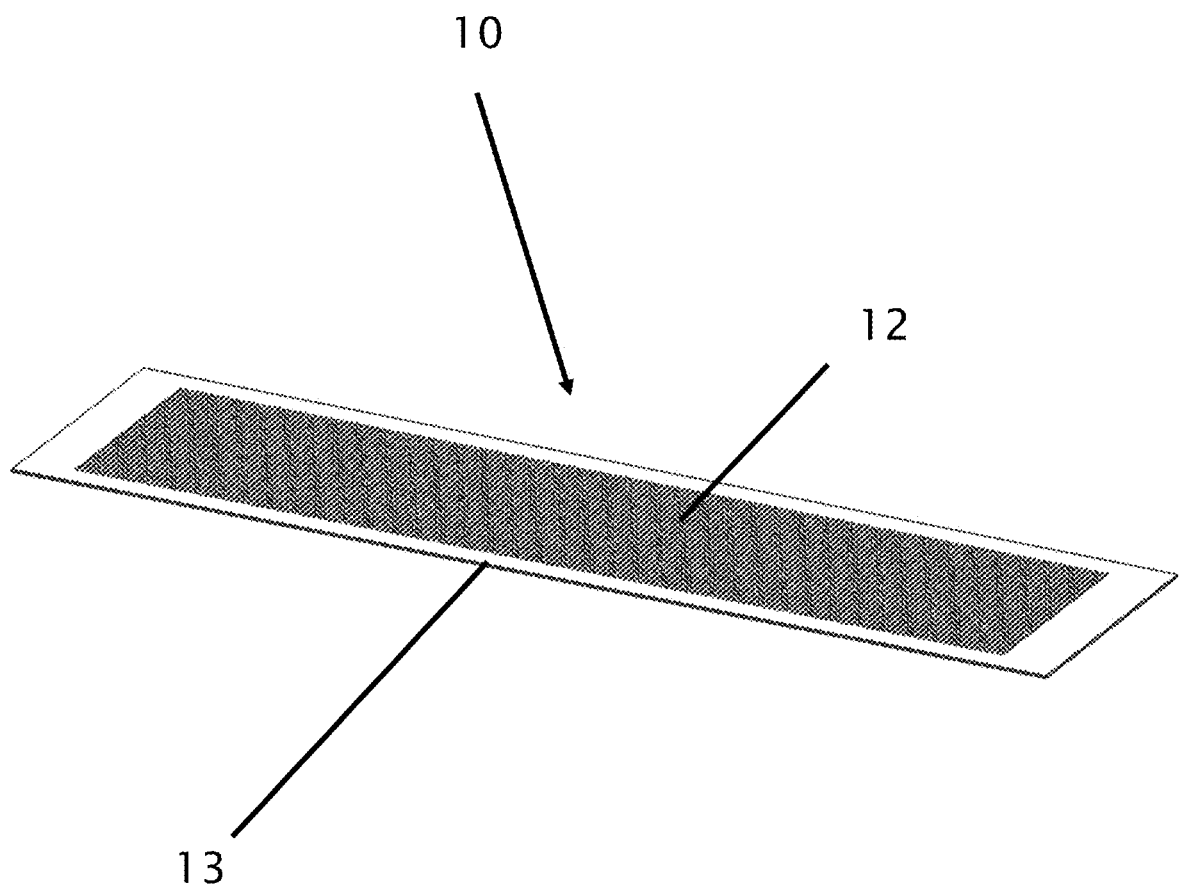
FIG. 1 is a perspective view of a section of a layered porous film.

FIG. 1 is a perspective view of a layered porous film 10. The layered porous film 10 includes a porous area 12 and a border 13. The border 13 is not required to make the film 10 functional, but it is useful when installing the porous film 10 in a device and in the manufacturing of the film itself.

Figure 2:
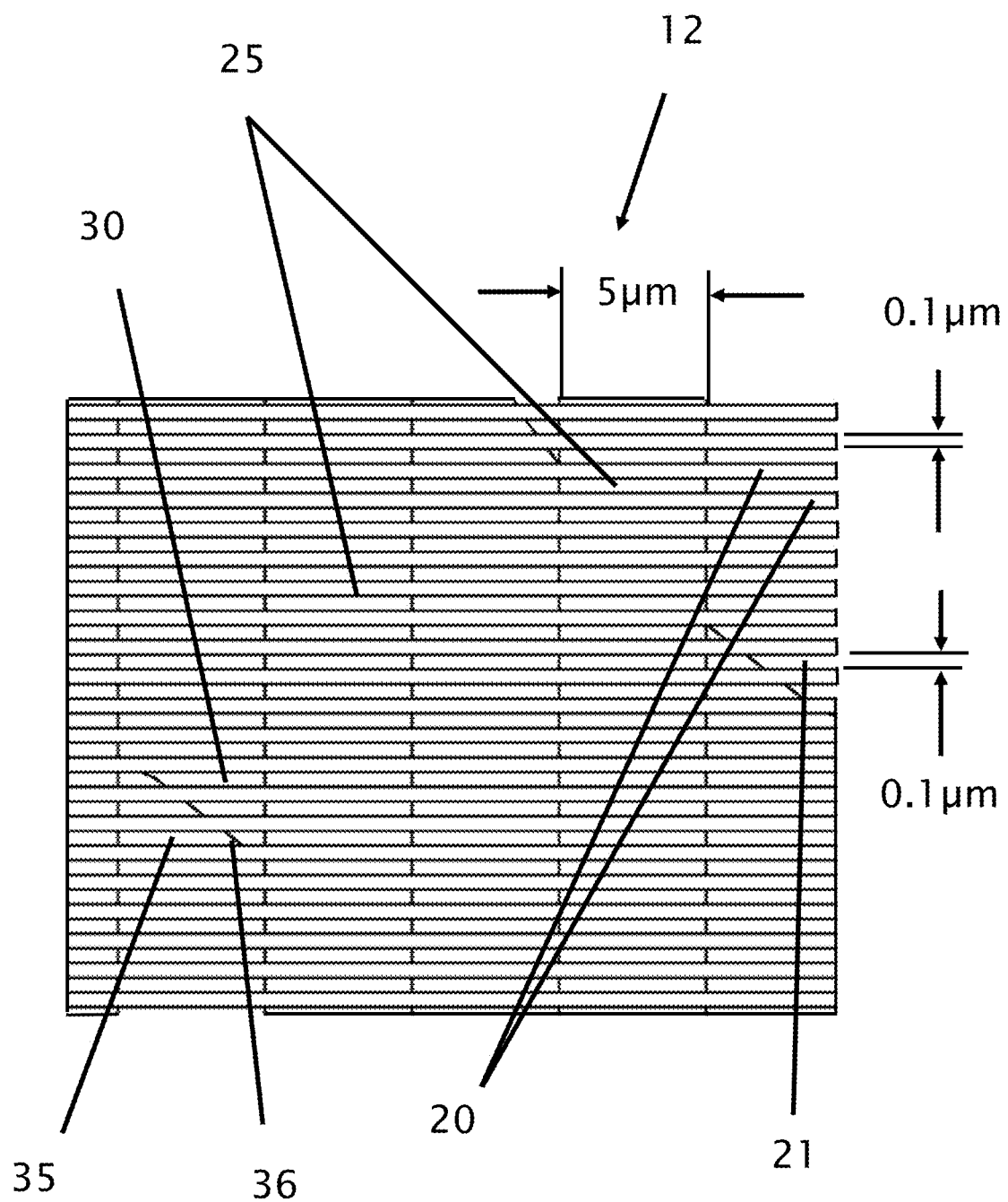
FIG. 2 is a top detailed view of the porous area of the layered porous film.

Referring now to FIG. 2, the details of the porous area 12 can be seen in greater detail than in FIG. 1. The porous area 12 generally includes at least three layers of material on top of one another. From the perspective of FIG. 2, the top layer is formed from nano ribs 20. The nano ribs 20 cover the entire porous area 12 and extend horizontally in orientation. Pores 21 are formed between the nano ribs 20. In various embodiments, the width of the nano ribs 20 and the pores 21 is approximately 0.1 μm. These dimensions are provided as a point of reference only. Depending on the application of the layered porous film 10 and the manufacturing needs of the user, the dimensions of the nano ribs 20 and the pores 21 may be much smaller or larger. The size is determined by the specific application requirements of the user.

Situated under the nano ribs 20 are the cross ribs 25. Lower surfaces of the nano ribs 20 are connected to the upper surfaces of the cross ribs 25. The cross ribs 25 support and maintain the location of the nano ribs 20, thereby establishing the width of the pores 21. The cross ribs 25 also cover the entire porous area 12 and run vertically in orientation. They are typically much larger than the nano ribs 20. For illustrative purposes, the width of the cross ribs 25 is shown at 5 pm in FIG. 2. The cross ribs 25 are also spaced apart from one another by 5 pm in the embodiment illustrated in FIG. 2. The area between the cross ribs 25 allows fluids to flow through the pores 21. Directly below the cross ribs 25 is the base film 30. The bottom surfaces of the cross ribs 25 are fastened to the top surface of the base film 30. The base film 30 is populated with holes 35 having an edge 36 to allow fluid flow through the pores 21.

Figure 3:
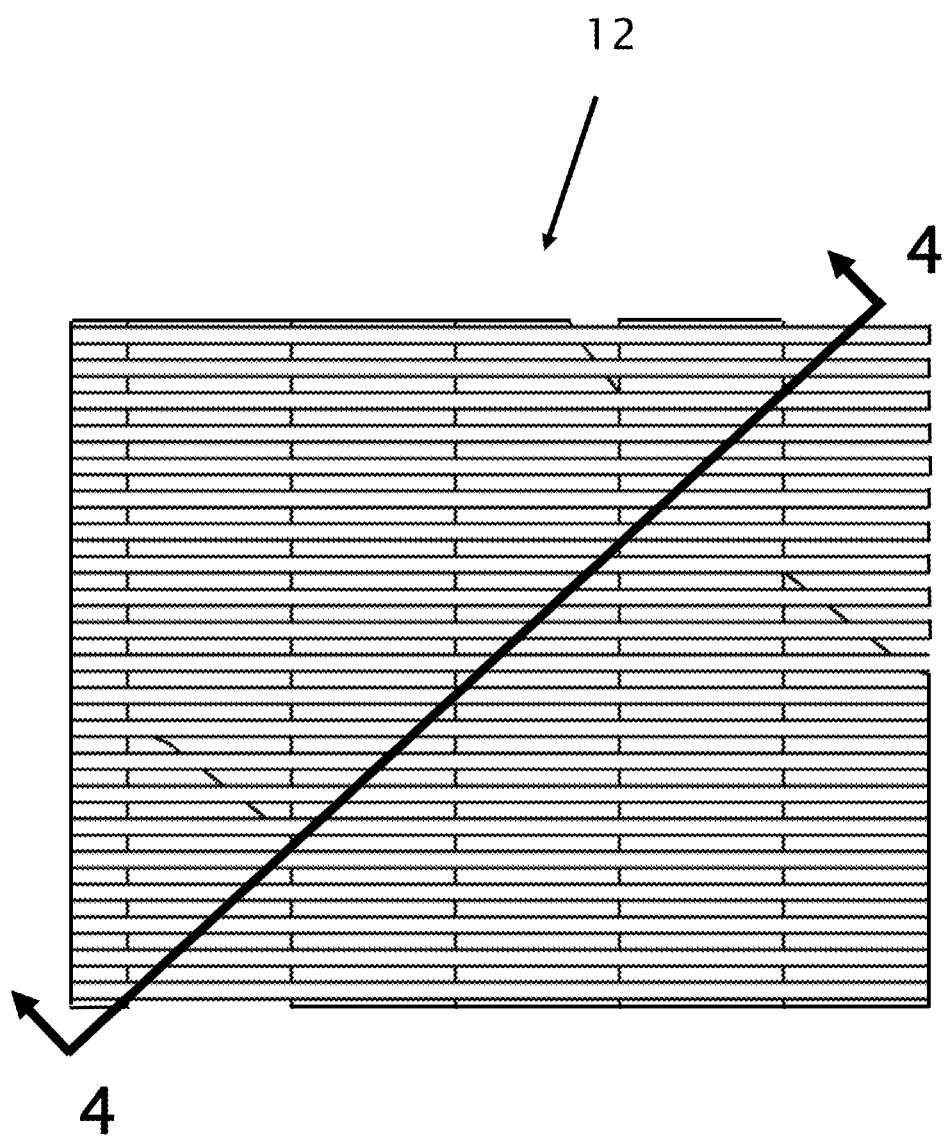
FIG. 3 is top detailed view of the porous area with cross section cut lines to identify a cut plane.
Figure 4:
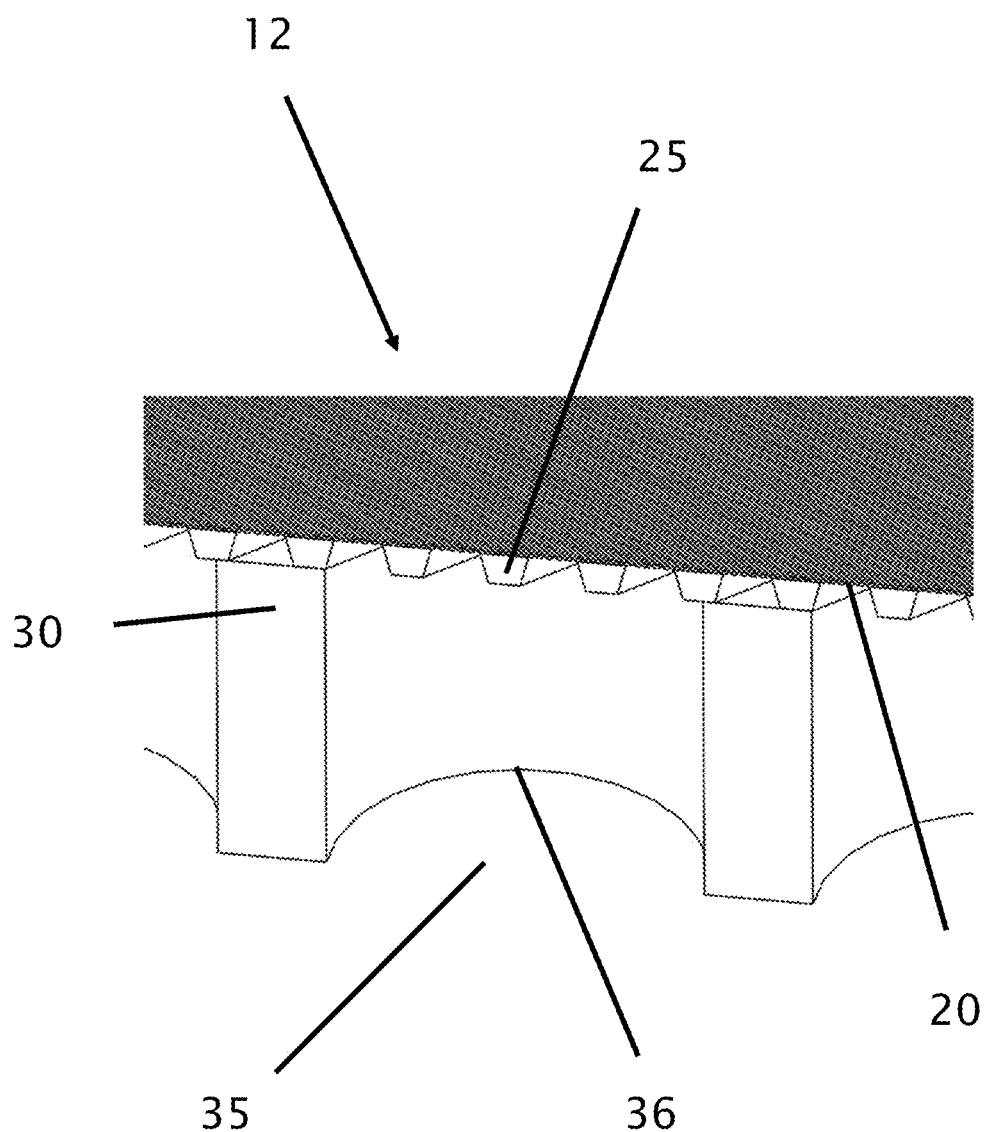
FIG. 4 is sectional view taken along line 4-4 in FIG. 3.
Figure 5:
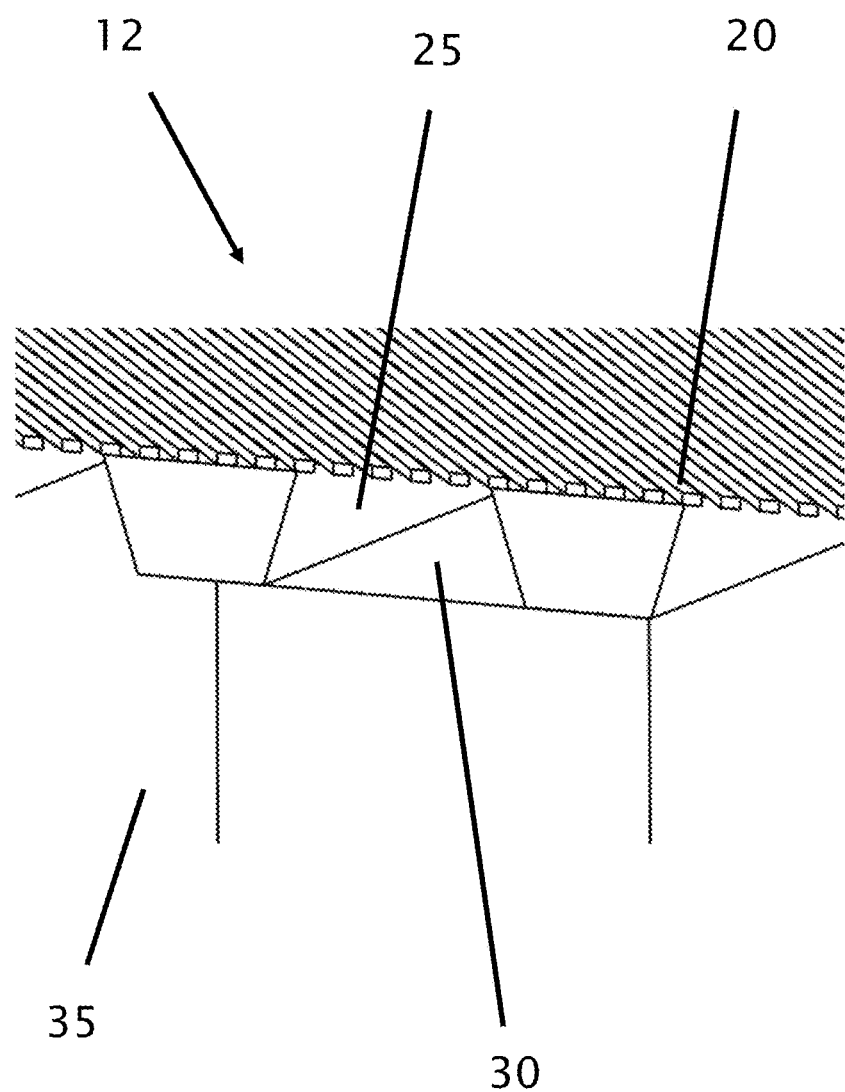
FIG. 5 is a closeup view of the same viewpoint as in FIG. 4.

Referring to FIGS. 3, 4, and 5, a different perspective of the porous area 12 can be seen. From this perspective one can more easily see the fluid path. Fluid can flow from top to bottom or from bottom to top. The filtering function of the film can be realized by flow from either direction. It should be noted that fluid can flow through the pores 21 that are not directly above the holes 35 having the edge 36. Fluid can flow transversely above the base film 30 and between the cross ribs 25 and exit through a pore that is not directly above the hole 35. There would be a slight increase in pressure due to this cross flow. It would be insignificant to the restriction at the pore 21. A pore the width of 0.100 microns has significantly more pressure drop than flow through the holes 35 or the gaps between the cross ribs.

Figure 6:
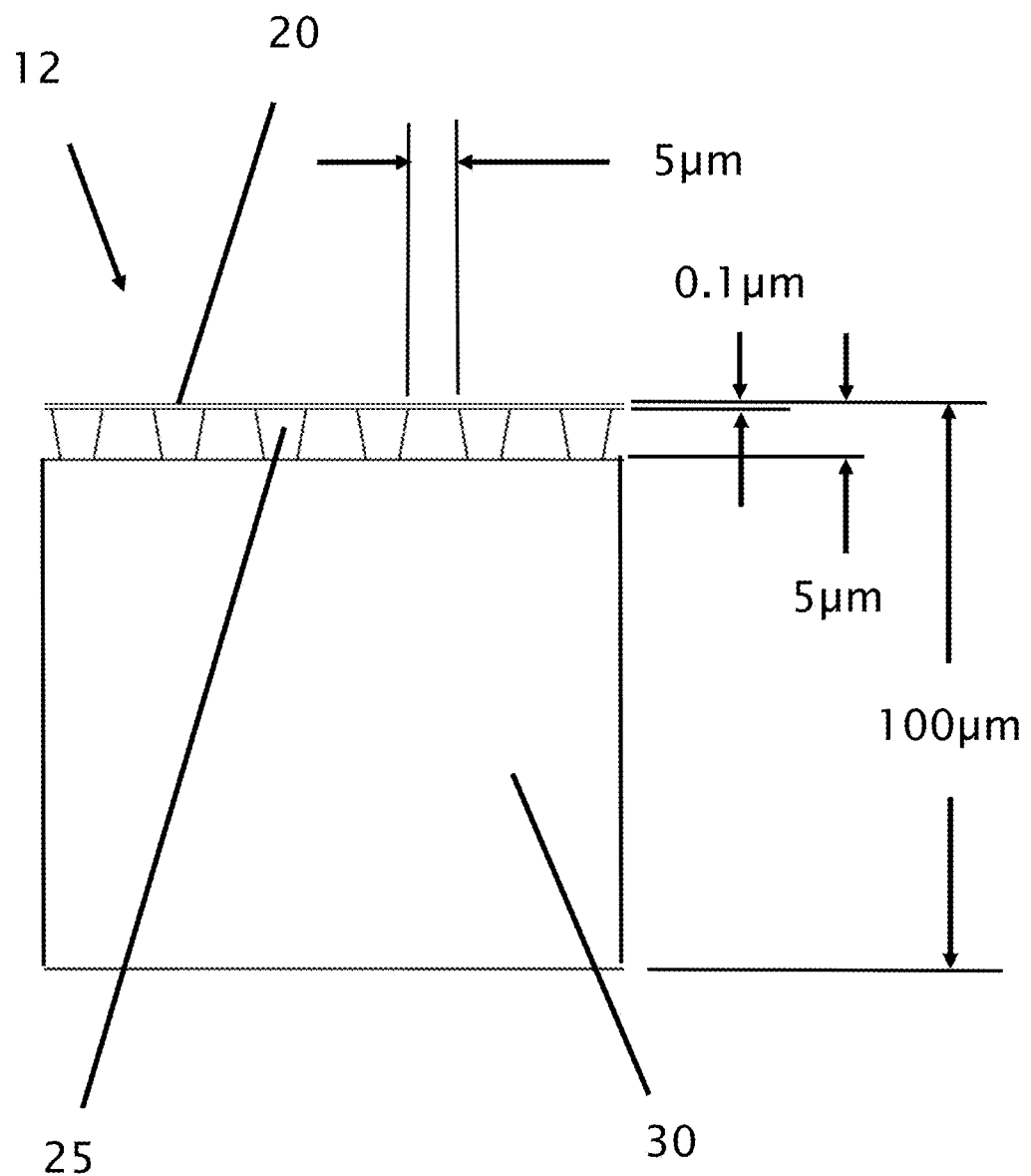
FIG. 6 is a detail view of a frontal cross section of the porous film shown in FIG. 2.

Referring now to FIG. 6, a front view of the porous area 12 is shown so that the relative thicknesses of the layers are easily seen. As with the rib widths, these illustrations are for exemplary reference only. The actual thicknesses of the layer will vary according to the requirements of a given usage.

Figure 7:
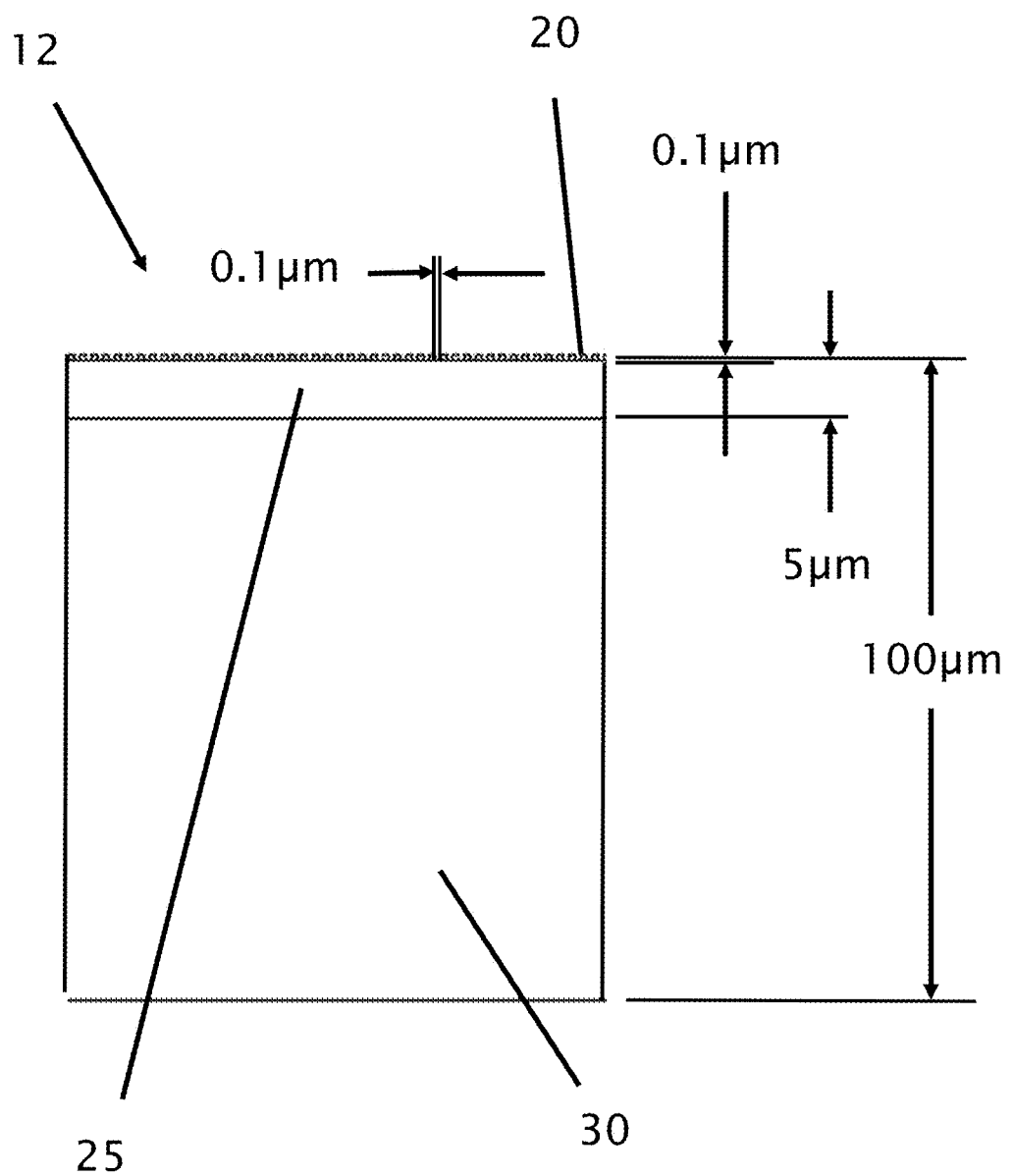
FIG. 7 is a detail view of a side cross section of the porous film shown in FIG. 2

FIG. 7 shows a side view of the same approximate magnification of FIG. 6, and also includes exemplary dimensions.

A number of commercially available manufacturing methods can be utilized to fabricate the layered porous film 10. Two of these methods are illustrated in FIGS. 8a and 8b. These methods are shown for illustrative purposes only. Yet another manufacturing method would be to coat a continuous layer of a material and ablate portions of the continuous layer to create ribs.

Figure 9:
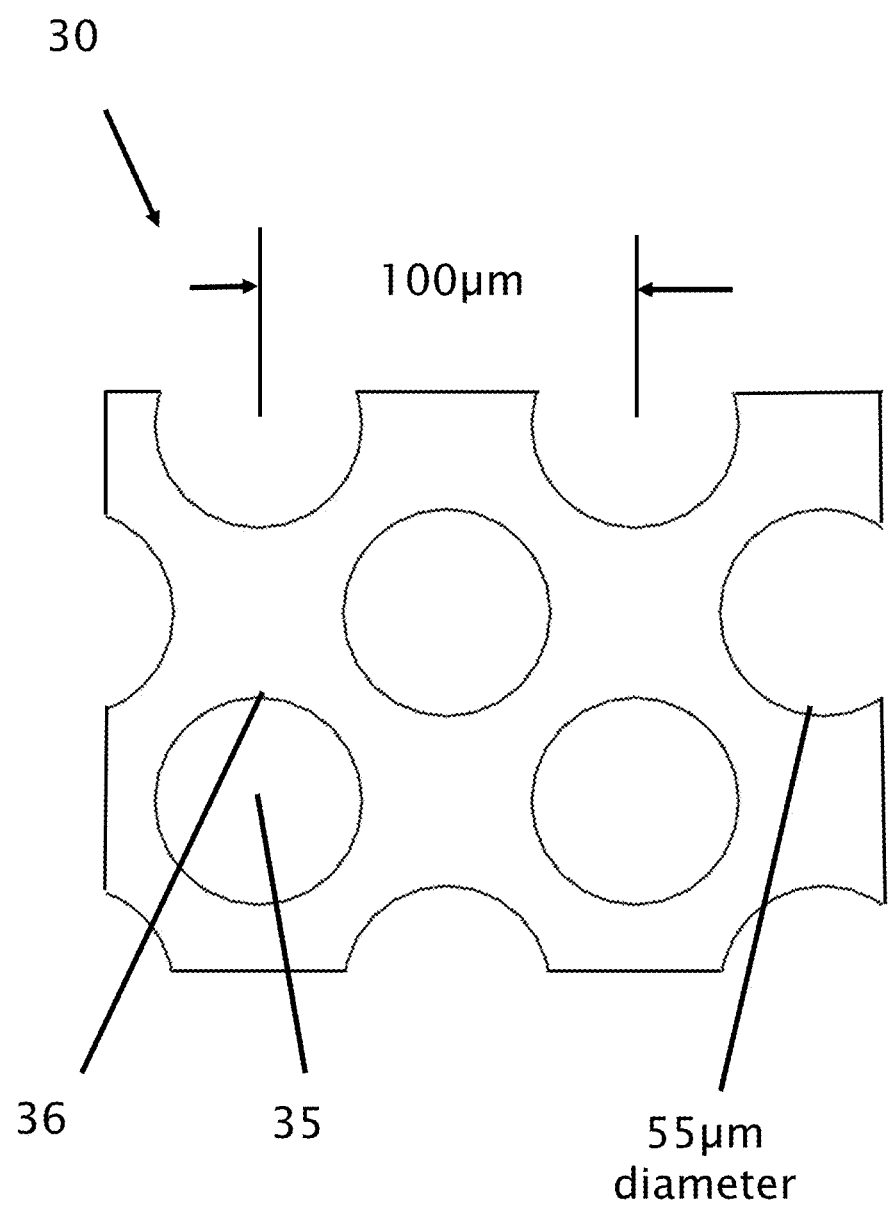
FIG. 9 is a top view of a base film.

FIG. 9 shows only the base film 30. The base film 30 is shown as including the holes 35 having the edge 36. The holes 35 allow for fluid flow to the pores. It should be noted that nearly any size and shape of hole 35 could be provided. The holes 35 could all be the same size, as shown. Depending on requirements of a specific embodiment, the holes 35 could of course be a different uniform size. Alternatively, the sizes of the holes 35 could be random. One purpose of the holes 35 is simply to allow flow to or from the upper two layers of the film. One skilled in the art of creating a film with relatively large holes could engineer the ideal design for the designated utilization depending on the requirements given.

Figure 10:
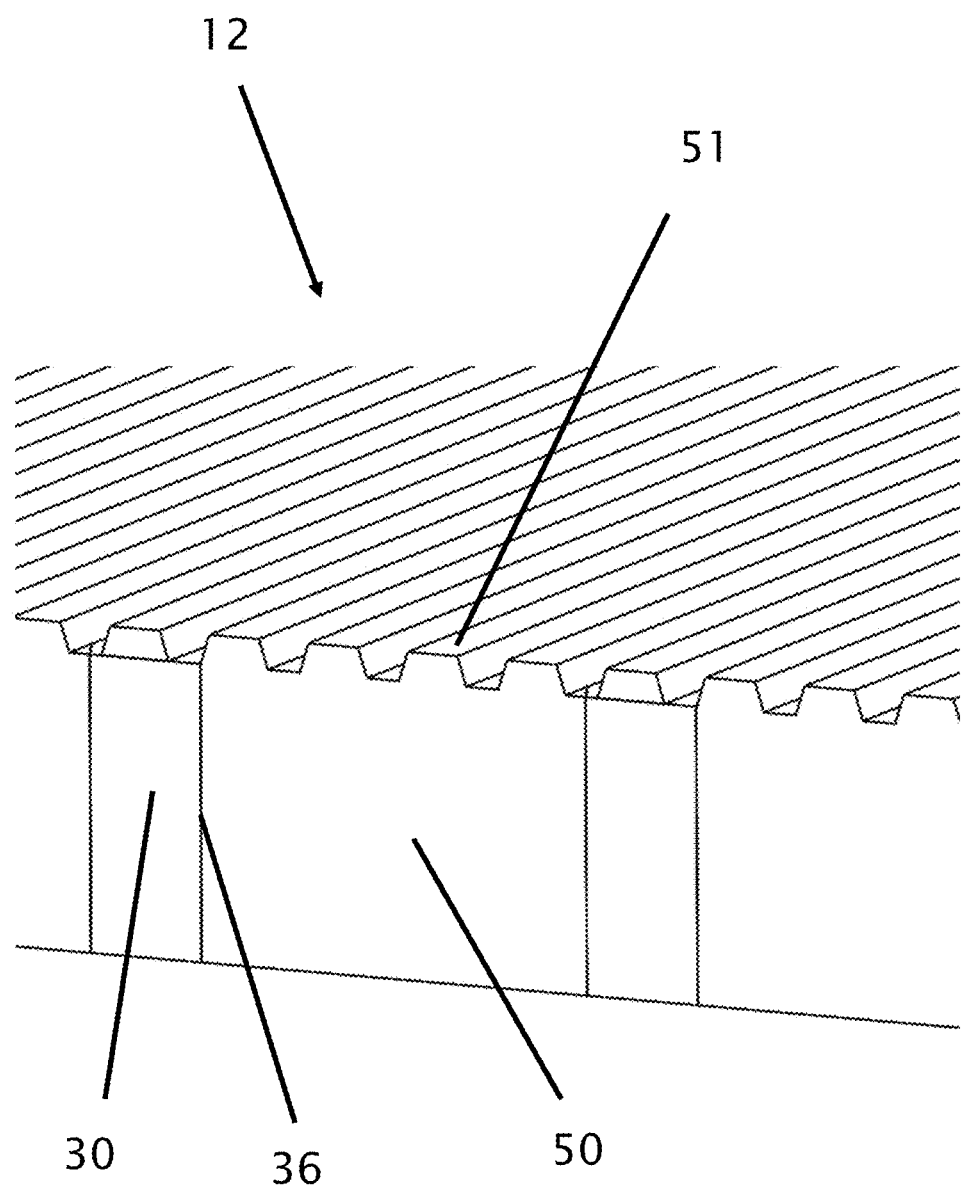
FIG. 10 is a perspective view showing the base film with a temporary layer of ribs applied.

FIG. 10 illustrates the initial process step in fabrication of the layered porous film 10. The holes 35 having the edge 36 in the base film 30 are filled with a temporary material 50. Later in the manufacturing process, the temporary material 50 will be removed. The temporary material 50 is also used to create temporary ribs 51. A tool with ribs of the same dimensions as the cross ribs 25 is placed on top of the base film 30 and filled with the temporary material 50 to create the temporary ribs 51.

Figure 11:
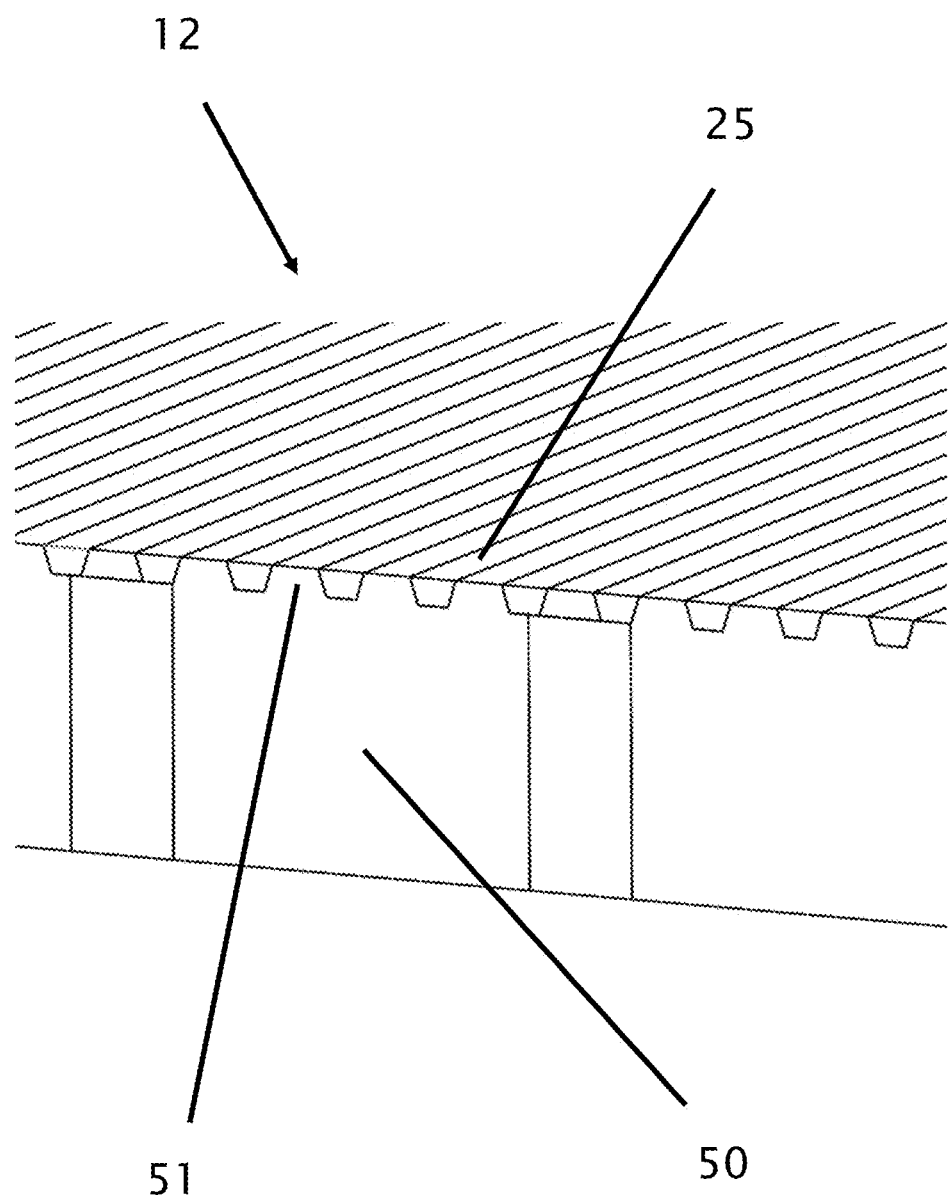
FIG. 11 is a view of the film taken from the same perspective as FIG. 10 showing the cross ribs added.

FIG. 11 shows the next processing step in the fabrication of the layered porous film 10. In this step the areas between the temporary ribs 51 have been filled with material to form the cross ribs 25. In this process the cross ribs 25 need to adhere to the top surface of the base film 30. The top surfaces of the cross ribs 25 and the temporary ribs 51 together form a flat surface. The flat surface allows for the creation of the nano ribs 20 is illustrated in FIG. 12.

Figure 12:
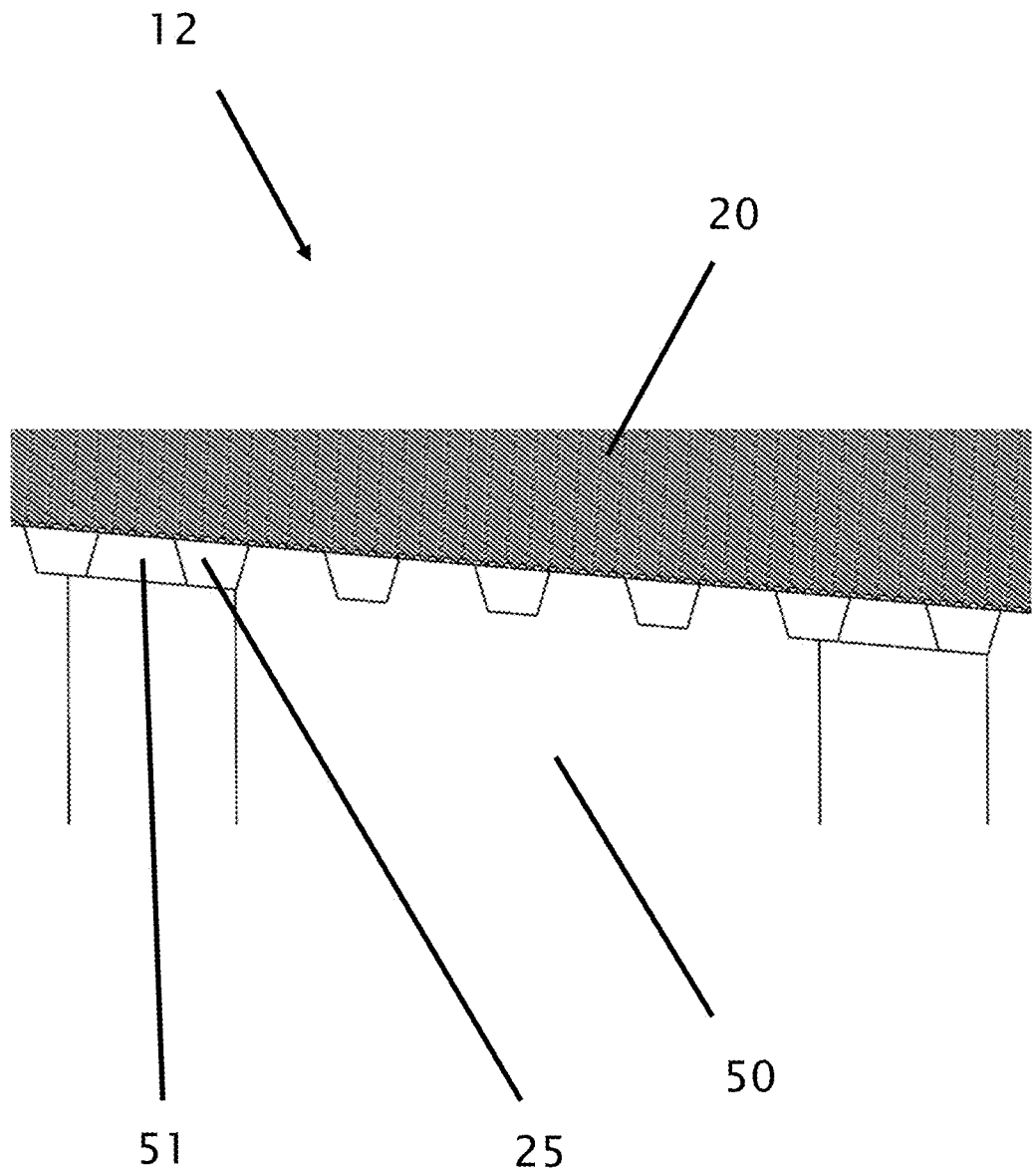
FIG. 12 shows the film from the same perspective with nano ribs added.
Figure 13:
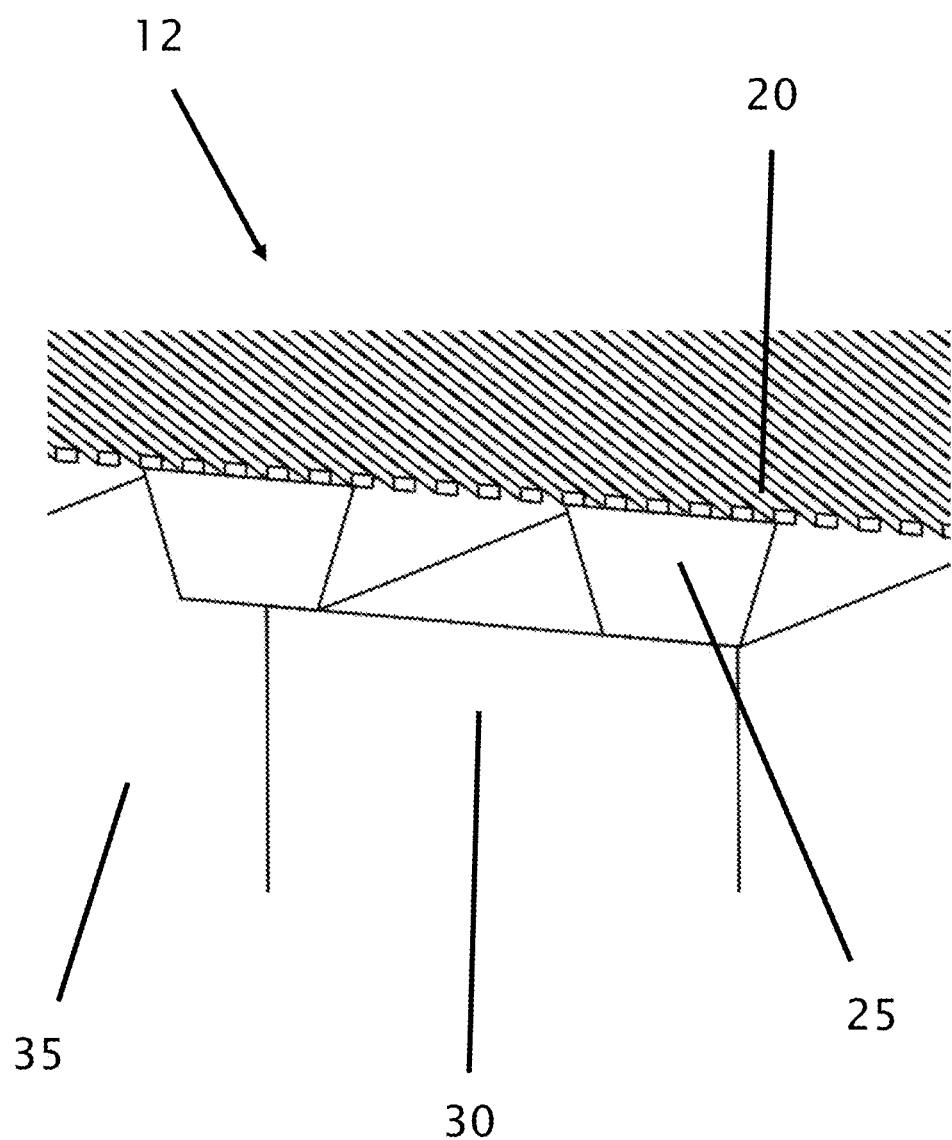
FIG. 13 is a top view of the film following additional processing.

FIG. 12 shows nano ribs 20 on top of the cross ribs 25 and the temporary (filler) ribs 51. The nano ribs 20 are bonded to the top surface of the cross ribs 25 during the formation process. To create paths for the fluid flow, the temporary material 50 and the temporary ribs 51 are removed. The final configuration of an exemplary embodiment of the layered porous film 10 is shown in FIG. 13 and in FIG. 4

Figure 14:
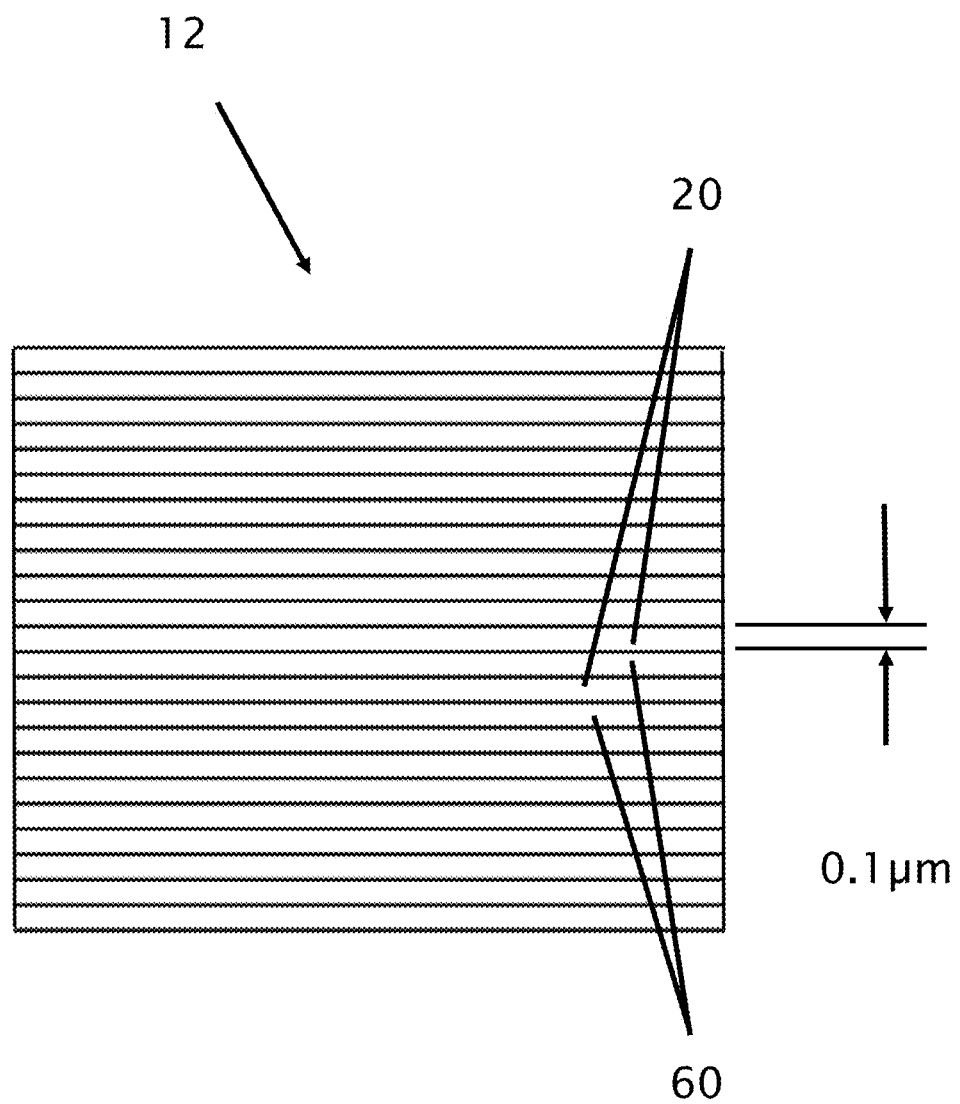
FIG. 14 shows a top view of the film shown in FIG. 12 with an additional process step to create an alternate embodiment.

FIG. 14 shows an exemplary embodiment of the invention before a further processing step. The further processing step is the removal of the temporary material 50 and temporary ribs 51 as shown in FIG. 12, and the addition of the $2^{nd}$ temporary ribs 60. The $2^{nd}$ temporary ribs 60 fill the area between the nano ribs 20. As noted above, the nano ribs 20 may be 0.1 micron wide, and the distance between them may also be 0.1 micron. As with the temporary ribs 51 and the cross ribs 25, the $2^{nd}$ temporary ribs 60 are the same height as the nano ribs 20, thereby forming a flat surface for still further processing.

Figure 15:
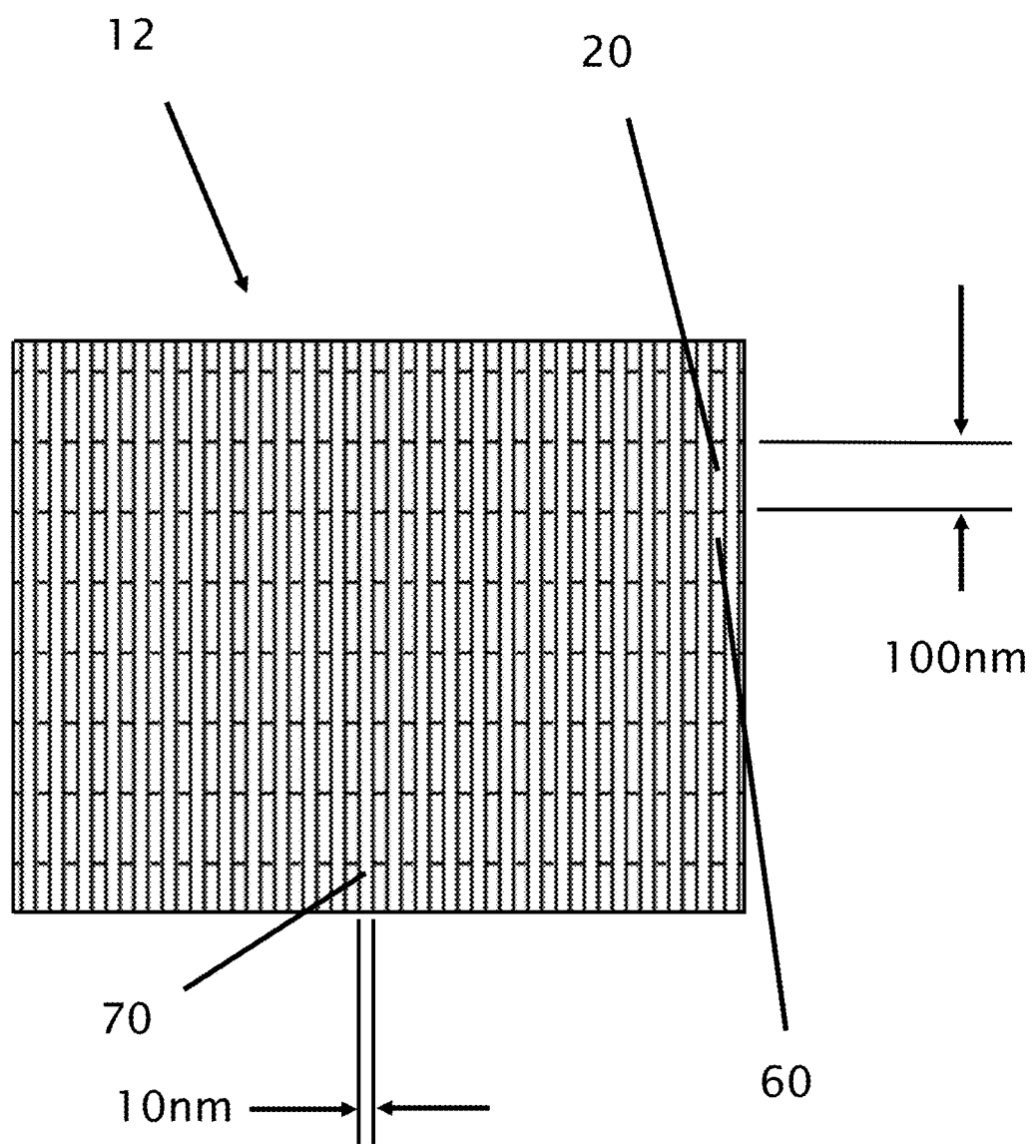
FIG. 15 is a top view of the alternate embodiment of the film shown in FIG. 14 following an additional process step.

Now referring to FIG. 15, nano cross ribs 70 have been added atop the $2^{nd}$ temporary ribs 60 and the nano ribs 20. The nano cross ribs 70 are on the order of ⅒ the size and spacing of the nano ribs 20. The bottom sides of the nano cross ribs 70 are fastened to the top surface of the nano ribs 20. An exemplary dimension of 10 nm is shown for the width of the nano cross ribs 70 and the spaces between them.

Figure 16:
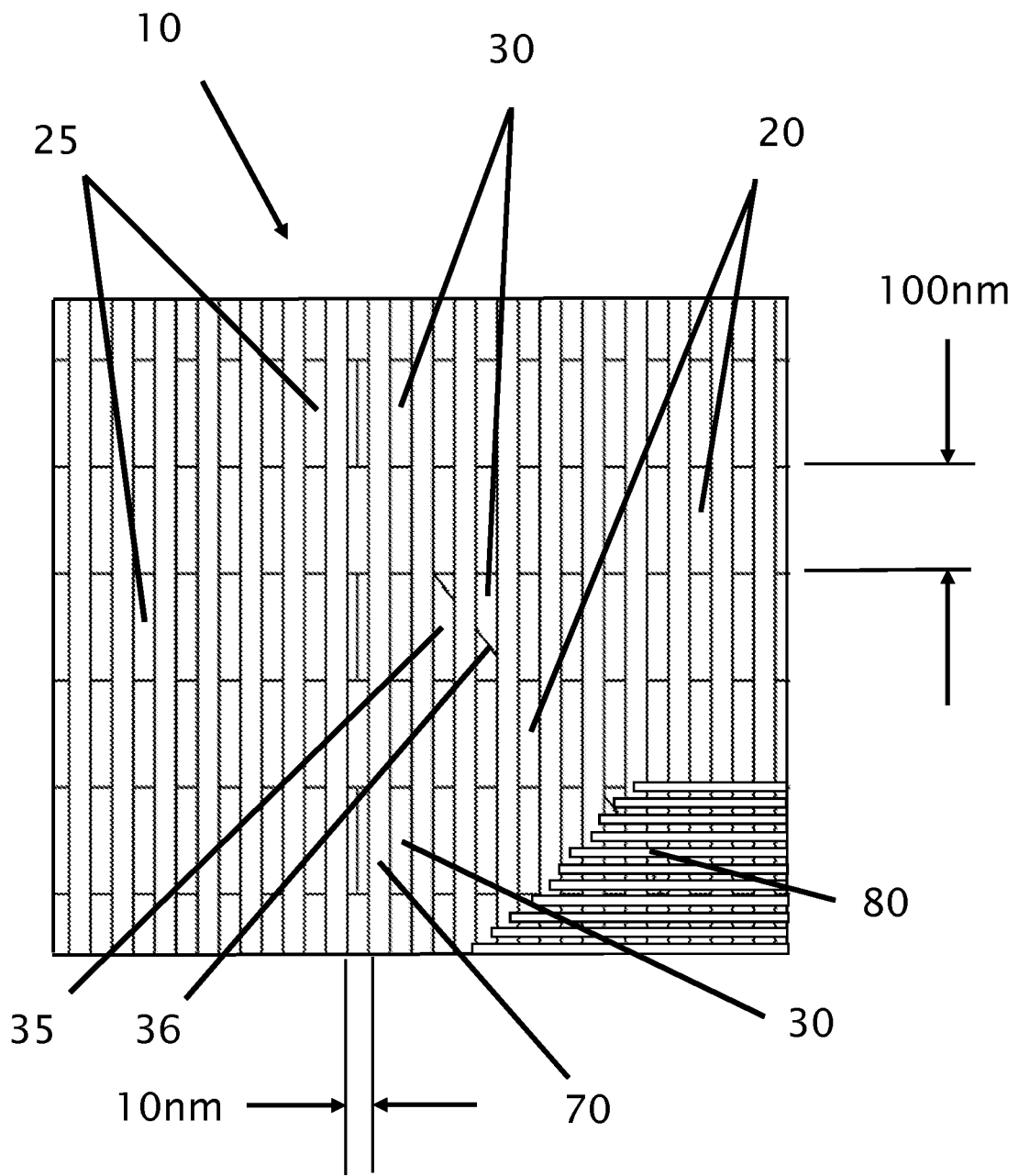
FIG. 16 shows the alternate embodiment of FIGS. 14 and 15 after a final process step.

FIG. 16 shows the porous film 10 after all of the processing has been accomplished. All of the temporary material has been removed to form the fluid paths. In FIG. 16, the lower layers of nano ribs 20, cross ribs 25, and the base film 30 having holes 35 with edges 36 can be seen. Pores of an exemplary width of 10 nm have been identified. The last layers of material are shown to be nano cross ribs 70 oriented in one direction and nano cross ribs 80 oriented in another direction. The top layer could also be a combination of horizontally and vertically oriented ribs. The latter configuration type might be deployed based on manufacturing requirements. An example might be when molecular sized features, pores, are desired. For the production of molecular sized features, chemical processing could be utilized, such as using the formation of carbon nano structures to form ribs. With chemical fabrication the shape of the ribbed layer structures is not easily controlled.

Figure 17:
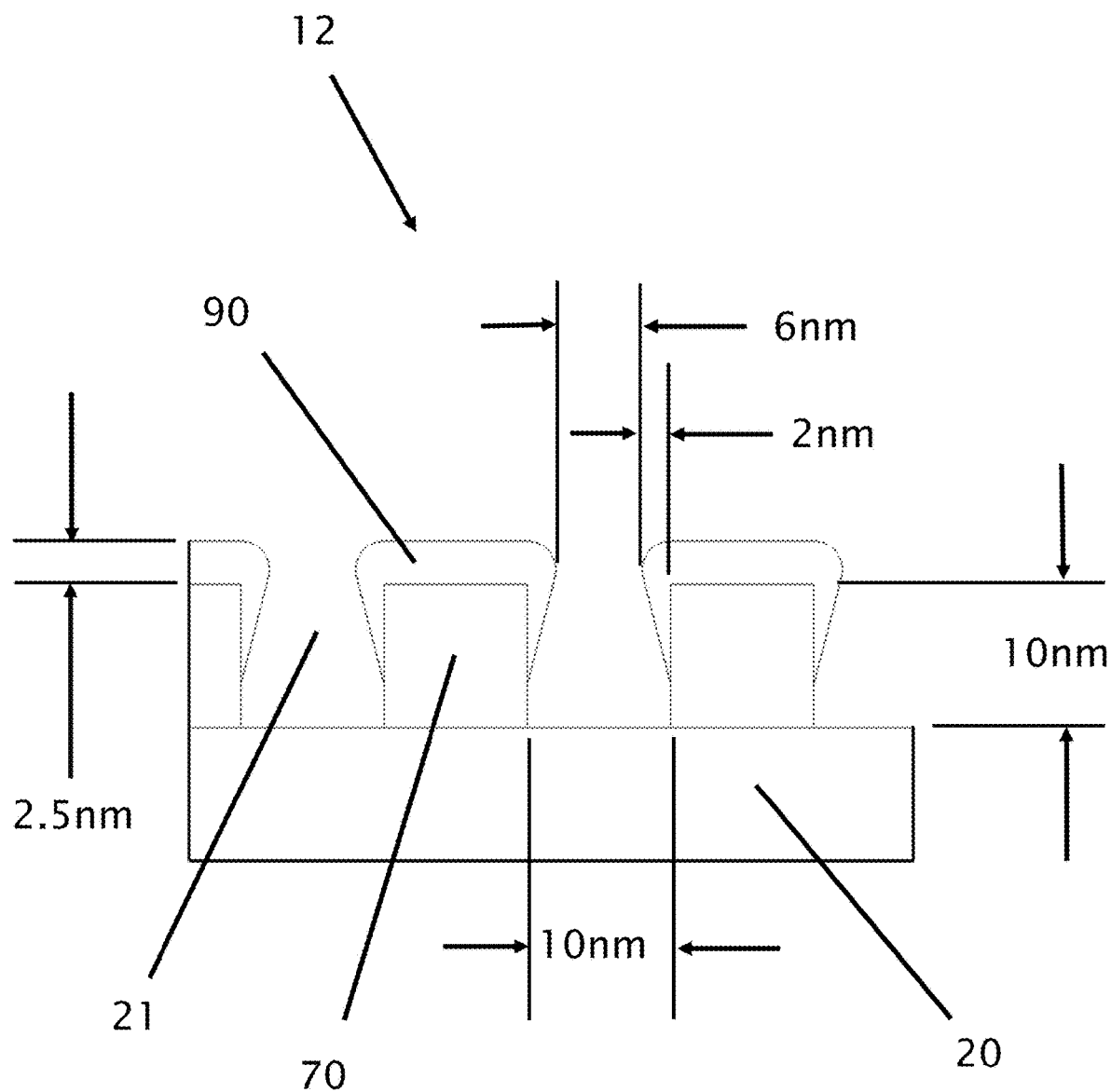
FIG. 17 shows a front view of a second alternate embodiment.
Figure 18:
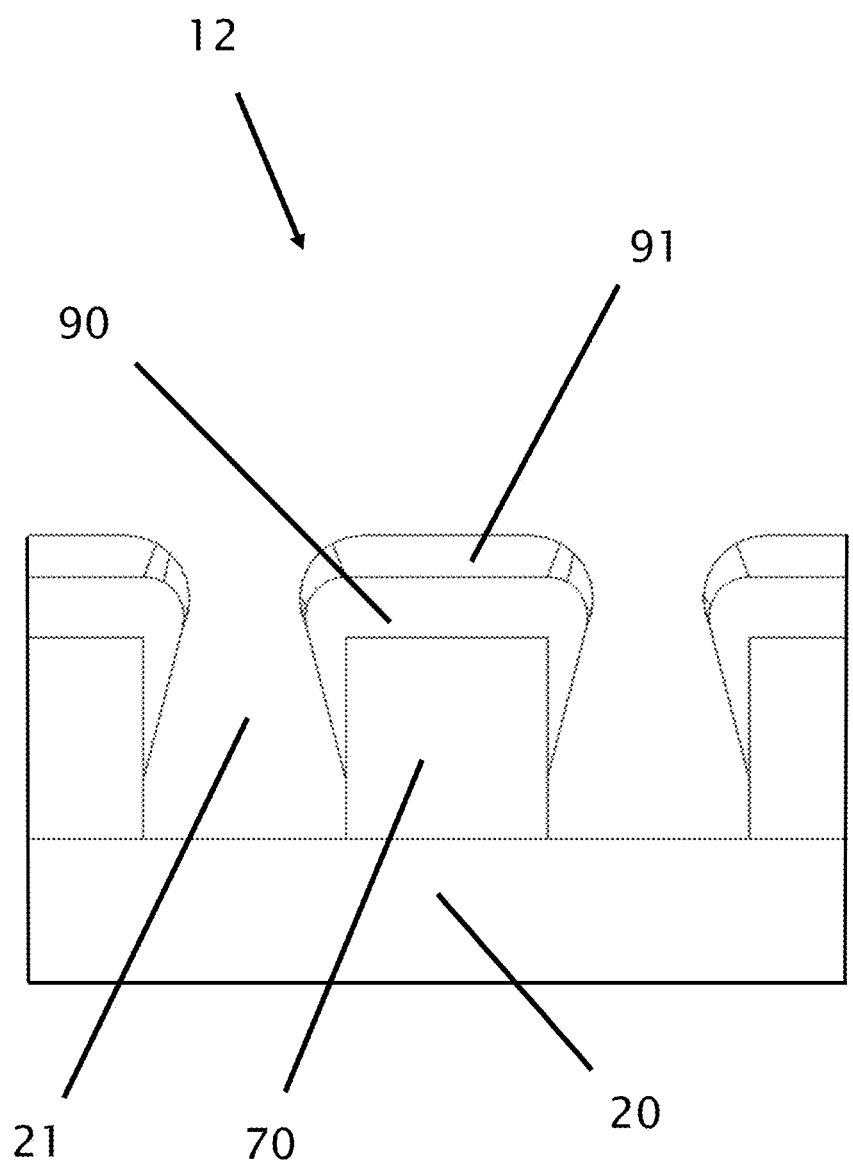
FIG. 18 shows a front view of a third alternate embodiment.

Referring now to FIG. 17, an alternate embodiment is shown. FIG. 17 is a highly magnified front cross section of the preferred embodiments described above, with the addition of a deposited material 90. Material 90 can be deposited on the top surface of any of the embodiments disclosed herein to reduce the effective size of the pores 21. Most deposition processes do not fill spaces conformally. A conformal type coating could be used, but a directional deposition is preferred. Exemplary dimensions of the deposited material 90 have been presented in FIG. 17. The type of material deposited can be used to not only reduce the size of the pores 21, but also to react with, or repel or attract, particles or compounds flowing through the porous area. A second material 91 as depicted in FIG. 18 could also be applied to further enhance the performance of the porous areas. One skilled in the art of coating would engineer a coating for the particular application of the film.

It should be noted that polymer materials are the most likely type of material used in the fabrication of the various embodiments of the invention. Other materials could also be utilized. Other materials might include metals, semiconductors, ceramics, glass, or other materials. Further, consistent use of two materials, structural and temporary, throughout the film is not required. One skilled in the art of materials could engineer a solution utilizing multiple types of materials for a particular application of the layered porous film.

A number of preferred embodiments have been disclosed in this disclosure. Specific inlet and outlet flow paths have been identified for discussion. In many cases one path identified as an outlet could also function as an inlet. Similarly, an outlet could function as an inlet. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While this technology is susceptible of embodiment in many different forms, there is shown in the drawings and herein described in detail several specific embodiments with the understanding that the present disclosure is to be considered as examples of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the Figures are merely schematic representations of the present disclosure. As such, some of the components may have been distorted from their actual scale for pictorial clarity.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

It is further noted that various Figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A layered porous film, comprising:
    a first layer with openings therein to allow fluid flow through the first layer;
    a second layer connected to the first layer and consisting of elongated members oriented in a first direction and spaced apart to form slots between the elongated members, the slots forming a path for fluid flow through the second layer;
    a third layer consisting of elongated ribs positioned orthogonally to the slots in the second layer and connected to the second layer, the elongated ribs being oriented in a second direction and spaced apart to form throughways to allow fluid flow through the third layer; and
    a fourth layer of elongated ribs connected to the third layer openings between the ribs of the fourth layer being smaller than the throughways of the third layer, wherein the ribs of the fourth layer are oriented in more than one direction; wherein
    the sizes of the openings, slots, and throughways are selected for a given application.

2. The layered porous film of claim 1, wherein the sizes of the openings in the first layer, the slots in the second layer, and the throughways in the third layer are progressively smaller from the first layer to the third layer.

3. The layered porous film of claim 1, wherein material is deposited on the ribs of the third layer so as to reduce the effective size of the throughways therein.

4. The layered porous film of claim 1, wherein material is deposited on the ribs of the fourth layer so as to reduce the effective size of the openings in the fourth layer.

5. The layered porous film of claim 1, wherein at least one additional layer is connected to the third layer.

6. The layered porous film of claim 5, wherein material is deposited on projecting elements of the least one additional layer so as to reduce the effective size of throughways in the least one additional layer.

7. The layered porous film of claim 6, wherein the material deposited on the projecting elements of the least one additional layer is selected so as to attract fluid passing therethrough.

8. The layered porous film of claim 1, wherein material of at least one of the layers is selected so as to attract fluid passing therethrough.

9. A multi-layered filtering device, comprising:
   a porous film comprising a first layer with openings therein to allow fluid flow through the first layer;
   a second layer connected to the first layer and consisting of elongated members oriented in a first direction and spaced apart to form slots between the elongated members, the slots forming a path for fluid flow through the second layer; and
   a third layer consisting of elongated ribs positioned orthogonally to the slots in the second layer and connected to the second layer, the elongated ribs being oriented in a second direction and spaced apart to form throughways to allow fluid flow through the third layer; and
   a fourth layer of elongated ribs connected to the third layer, openings between the ribs of the fourth layer being smaller than the throughways of the third layer, wherein the ribs of the fourth layer are oriented in more than one direction: wherein
   the sizes of the openings, slots, and through ways in the porous film are selected for a given application.

10. The filtering device of claim 9, wherein the sizes of the openings in the first layer, the slots in the second layer, and the throughways in the third layer are progressively smaller from the first layer to the third layer.

11. The filtering device film of claim 9, wherein material is deposited on the ribs of the third layer so as to reduce the effective size of the throughways therein.

12. The filtering device of claim 9, wherein material is deposited on the ribs of the fourth layer so as to reduce the effective size of the openings in the fourth layer.

13. The filtering device of claim 9, wherein at least one additional layer is connected to the third layer.

14. The filtering device of claim 13, wherein material is deposited on projecting elements of the least one additional layer so as to reduce the effective size of throughways in the least one additional layer.

15. The filtering device of claim 14, wherein the material deposited on the projecting elements of the least one additional layer is selected so as to attract fluid passing therethrough.

16. The filtering device of claim 9, wherein material of at least one of the layers is selected so as to attract fluid passing therethrough.

* * * * *